No. 857,890. PATENTED JUNE 25, 1907.
J. T. McINTOSH.
AUTOMATIC SAFETY STOP DEVICE FOR ELECTRIC VEHICLES.
APPLICATION FILED JUNE 14, 1902.

2 SHEETS—SHEET 1.

Witnesses:
Ira D. Perry
Herman M. Kruege

Inventor:
John Thomas McIntosh
By Charles H. Roberts
Atty.

No. 857,890. PATENTED JUNE 25, 1907.
J. T. McINTOSH.
AUTOMATIC SAFETY STOP DEVICE FOR ELECTRIC VEHICLES.
APPLICATION FILED JUNE 14, 1902.
2 SHEETS—SHEET 2.
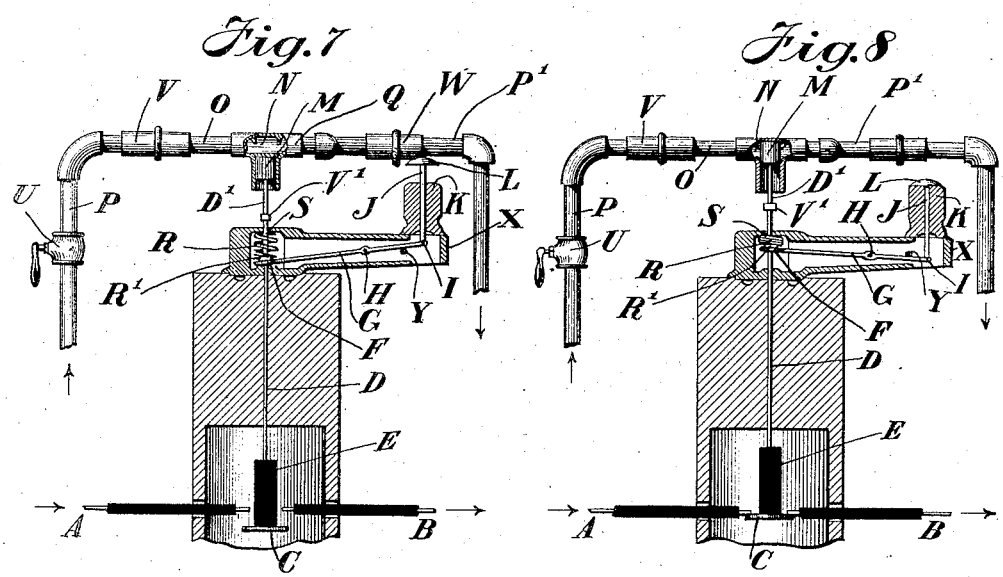
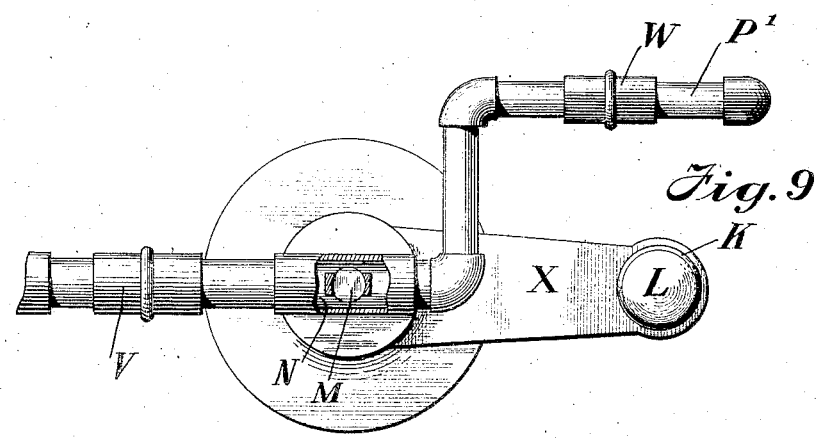

UNITED STATES PATENT OFFICE.

JOHN THOMAS McINTOSH, OF CHICAGO, ILLINOIS, ASSIGNOR OF ONE-THIRD TO CHARLES H. ROBERTS, OF EVANSTON, ILLINOIS.

AUTOMATIC SAFETY STOP DEVICE FOR ELECTRIC VEHICLES.

No. 857,890.      Specification of Letters Patent.      Patented June 25, 1907.

Application filed June 14, 1902. Serial No. 111,592.

*To all whom it may concern:*

Be it known that I, JOHN THOMAS McIN-TOSH, a citizen of the United States, residing at Chicago, in the county of Cook and State of Illinois, have invented a new and useful Automatic Safety Stop Device for Electric Vehicles, of which the following is a specification.

Figure 1:
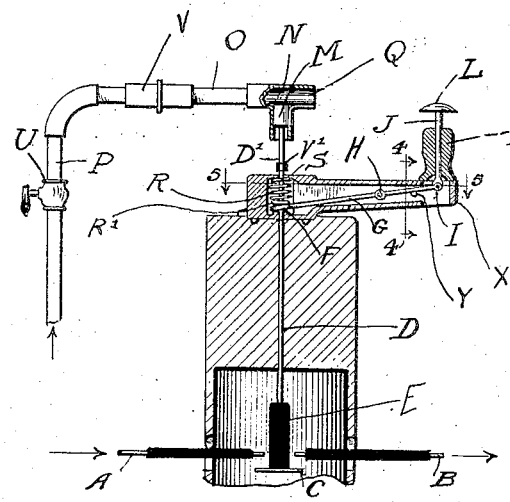
Figure 2:
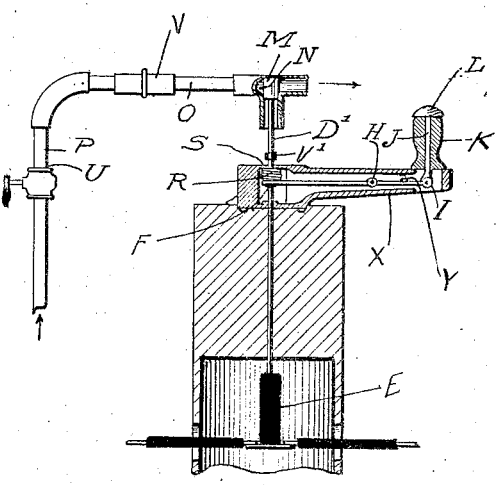
Figure 3:
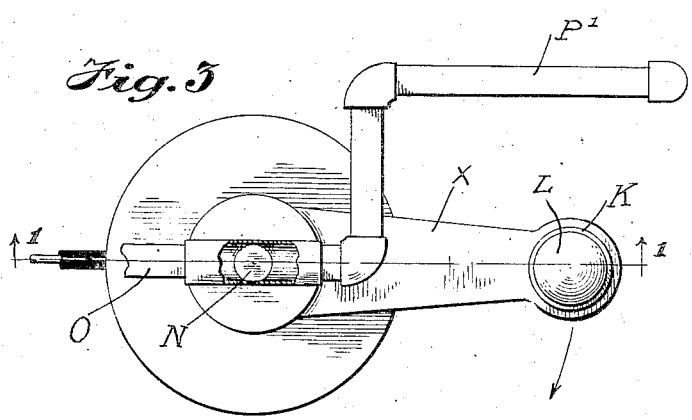
Figure 4:
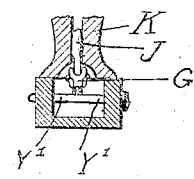
Figure 6:
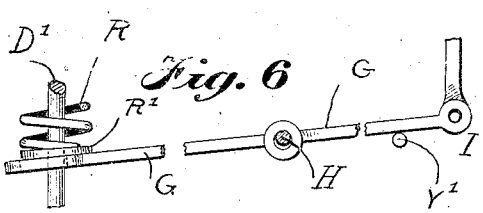
Figure 5:
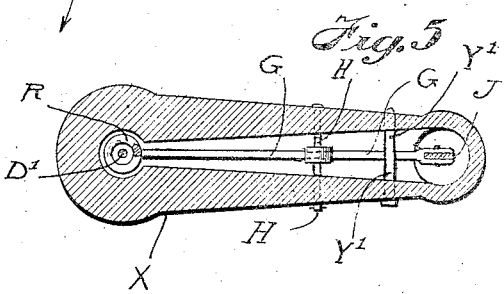

My invention relates to electric controllers and fluid pressure brakes for cars or any vehicle propelled by electricity and having a fluid pressure brake apparatus and the objects of my invention are to provide means for controlling the electric current and for controlling at the same time, by simple mechanism, the application of the brake to the car or vehicle to which it is attached, whereby the use of the electric current is rendered more safe than heretofore and the application of the brakes is secured with more certainty than heretofore, and whereby certain results previously requiring intelligent action by the motorman or person in charge of the car or other vehicle, are secured by automatic action; and whereby the operation of the car or other vehicle is rendered more safe and the control of the electric current a t the brake apparatus is secured in case of accident or emergency. I secure these results by the mechanisms and methods illustrated in the accompanying drawings in which Figure 1 is a sectional view of my controller arm and attachments when the operator's hand is removed. Fig. 2 is a plan of my controller arm and attachments when the operator's hand is applied to the controller arm in the usual way. Fig. 3 is a plan showing the air brake pipe when the device is used with a straight air brake apparatus. Fig. 4 is a section on lines 4—4 of Fig. 1. Fig. 5 is a section on lines 5—5 of Fig. 1 showing the lock for the controller arm. Fig. 6 is a detail of the lever. Figs. 7, 8 and 9 show the pipe connection when the straight air brake system is used.

Similar letters refer to similar parts throughout the drawings.

My invention is designed to be used in connection with any of the ordinary forms of controllers now in use for the purpose of controlling the current of electricity applied to a car or other vehicle or independently of the same and it may also be used in the absence of the electric current in controlling the application of the brakes independently of an electric current.

The current after passing through the controller, enters the controller box on its return from the motors (not shown) through the ground wire A and when in operation passes through contact plate C, into B, a continuation of ground wire A. Upon the lower end of rod D and extending for several inches upon the rod D is the insulator E. The rod D is connected at the joint F with one end of the lever G operating on the fulcrum H, and having the power applied at the point I by means of a rod J extending through the controller arm handle K, and having the knob L upon the top where the hand of the operator naturally grasps the handle upon the controller arm. The lever G also is connected at the joint F with the rod D' upon the end of which is the piston M operating in the chamber or cylinder N in the same manner a slide valve ordinarily operates, either opening or closing the passage in the branch train line O according to the position of such piston M. The branch train line O is connected at the end of the pipe P in the case of an automatic brake apparatus with the main train line and terminates at the end Q opposite to P in an opening to the atmosphere. The branch train line O when the apparatus is used in connection with a straight air brake apparatus, is connected through the pipe P with the main air reservoir and through the pipe Q extended (shown in dotted lines in Figs. 1 and 2 as pipe P') is connected with the main train line.

Figure 1 shows the apparatus with the electric current broken and the air passage open, in which position the slight expansive force of the spring R resting upon its seat S, or, it may be if desired the superior weight alone of the parts operating on the fulcrum H, maintains the joint F at the end of the lever G in the position shown in Fig. 1, pushing the rod D downward and breaking the circuit between the wires A and B, interposing the insulator E between the two wires A and B and thus preventing the current of electricity from flowing through the wires A and B. At the same time the rod D' connected at the joint F with the lever G remains in the position as shown in Fig. 1, bringing the piston M to the lower part of the cylinder N and opening the pipe O so that the air has a free passage in said pipe O from the pipe P to opening Q. The result of this position of the apparatus is that the electric circuit is broken and the air freely passing from pipe P to opening Q produces, where the attachment is operated in connection with an automatic air brake, a passage of air from the train line connected with pipe P to the atmosphere, into which Q opens, thus decreasing the pressure in the train line, which operates by a well-known mechanism to apply the brakes upon the car; and in the case of a so-called straight air brake apparatus, the opening of the passage in the branch train line O produces a passage of air through the pipe P from the reservoir to which it leads, as above described, to the pipe P' and thus into the train line as above described, operating by well-known mechanism to thereby apply the brakes to the car or other vehicle.

Fig. 2 shows the operation of the apparatus illustrated in Fig. 1. When the knob L is pressed down by the hand of the operator, the rod J likewise moves downward and imposes a downward motion at point I of the lever G and an upward motion of the end F of the lever G, compressing the spring R toward its seat S and likewise imposing an upward movement upon the rod D' through which the piston M moves upward through its chamber or cylinder N and operates to close the opening in the train line O as indicated in Fig. 2. The upward movement of end F of lever G likewise moves rod D upward, in consequence of which, the contact plate C is brought into contact at either side with the electric conduits A and B, thus closing the electric circuit and allowing the electricity to flow from A to B. It will thus be seen that when the knob L is pressed down so as to rest upon the top of the wooden handle K upon the controller arm X through the operation of rod D, the contact plate being brought against the electric conduits A and B, the circuit is thereby closed and at the same time through the action of rod D' the piston M closes the branch train pipe O and prevents the passage of air from P to Q and thus prevents the application of brakes to the car or other vehicle. So long as the pressure on the knob L is maintained upon the top of the handle K as last explained, the electric current is permitted to flow and can be controlled in the usual way by well-known mechanism, but the moment the pressure upon the knob L is released, the spring R or the weight as aforesaid acts, the contact plate C is forced downward, thus opening the circuit and cutting off the electricity and at the same time the piston M is forced downward, opening the branch train line O and allowing the air to pass from P to Q, thus requiring the operator during all the time the controller is in operation, to keep his hand pressed upon the knob L and in the event of any accident to the operator resulting in the removal of his hand from the knob L, the current is instantly broken, which instantly acts as aforesaid to stop the car or other vehicle.

*Explanation of drawings for straight air equipment.* In making connections for straight air, the pipe P would be connected to the main reservoir pipe, (that is the pipe leading from main reservoir to engineer's valve) (not shown). The pipe P' would be continued and connected to the main train line. When the main reservoir is charged with air, pipe P would be charged up to the piston M, said piston stopping the passage of air into pipe P' when the mechanism is in the position shown in Fig. 8.

Fig. 7 shows the position of the mechanism when the operator's hand is removed from the knob L, showing an open electric circuit, by contact plate C being forced by spring R away from contacts A and B at the same instant the piston M has been drawn by the same movement through cylinder N thus allowing the air in pipe P to freely flow into pipe P' thence into the main train line (not shown) and from main train line into brake cylinder, thus setting the brakes. Everything would remain in this position until restored to normal position by hand by the following procedure. Supposing that the operator's hand has been removed through carelessness or accident while running full speed, this movement would have caused an open circuit and applied the brakes as just described and to release the brakes, the controller should be returned to off position (not shown), then by placing the hand on knob L the piston M is returned to its seat, thus again closing the passage from pipe P to pipe P', when the operator by throwing the engineer's valve (not shown) into release position would allow the air that had been forced into the main train line and brake cylinders to escape to the atmosphere in the usual manner through the engineer's valve and release the brakes. This mechanism is designed to be used in conjunction with the electrical and air brake equipments already in use, and is not designed to displace any part of them. It has nothing to do with the feeding of current into the motors, that being done in the usual manner, it merely causes an open circuit in ground wires A and B by forcing contact plate C away from them and interposing the insulator E. Neither is it designed for applying the brakes in all cases, the ordinary stops being made in the usual manner by the operator using the engineer's valve. This mechanism does not interfere in any way with the operation of the brakes in the usual manner. It is designed to automatically cause an open electric circuit and at the same instant to apply the brakes when the operator accidentally or through carelessness removes his hand from knob L.

*Release of automatic brakes.* When piston M is pulled from its seat, by the removal of operator's hand from knob L, Fig. 1, pipe P having been connected to main train line, the same being charged with air in the usual manner, the air will pass from pipe P through cylinder N to the atmosphere at opening Q, thus causing a reduction of train line pressure and setting the brakes in the usual manner. To release, the piston M must be returned to its seat as before described, then the operator by throwing his engineer's valve in release position will release the brakes by restoring train line pressure in the usual manner.

A cut-off valve U is interposed in the pipe P to disconnect the apparatus from the train line in the case of the automatic air brake apparatus and in the case of a straight air brake apparatus, to disconnect the pipe P from the main air reservoir.

The entire apparatus may be rendered inoperative and maintained in either the condition shown in Fig. 1 or that shown in Fig. 2, by a pin lock operated by inserting the pin Y in the pin hole Y', thus maintaining the lever G in its position as shown in either Fig. 1 or Fig. 2 as desired and locking the apparatus either on or off. A padlock (not shown) may fasten the pin lock securely against meddling or accidents.

Unions V and W are inserted in branch train line O and P' to facilitate the disconnection of the cylinder N and a union V' is inserted in the rod D' to facilitate disconnection of the controller arm from the controller.

I am aware that mechanism exists whereby on the release of the controller arm from the hand of the operator the electricity is automatically cut off; but I do not know that anyone but myself has ever heretofore combined such automatic cut off of the electricity with a connected and synchronous application of the air brakes on a car or other vehicle.

It will be seen that while in the operation of breaking the circuit merely, any device may be similar to known devices, yet these devices in order to reset the circuit breaker, or restore the current, rely on some movement of the controller handle, usually lateral, and to off position; whereas, by my device the circuit may be both broken and restored either one time or successively, directly, and if desired with a still handle, and this without change of the position of any controller, controller shaft or sleeve. This avoids the danger from an arc welding the contacts or destroying any of those features and the consequent loss of train control by the motorman not being able to shut off power, as even if this happens in motors having my device the motorman has only to raise his hand from the knob L and the circuit is automatically broken at another point, and the brakes synchronously applied and the train stopped. Again, if the controller was still disabled, to restore the circuit and release the brakes, controller action is not necessary, as pressure on the push button L performs both these operations. These synchronous operations of breaking the circuit and setting the brakes, and restoring the circuit and releasing the brakes by successively pushing and releasing the knob or push-button L, may be alternately performed in rapid succession as often as desired and with either a still or moving controller handle. Thus the powerful effect of the joint deterrent action of the applied electric cut-off and brakes may be graduated at the will of the motorman by successive pressure and release of the push-button L. These actions are not feasible with controller or other devices which require either to actuate or to reset the circuit breaker to be turned to an off or to another position. Except as to limitations imposed by the prior art, I do not limit my invention, as the features of successive automatic opening of the circuit with or without a still handle in all positions of the controller (or without a controller) alternating with the closing of the circuit and the closing of the circuit independently of controller action, and joined to a responsive and harmoniously acting brake apparatus, may in some or all of their forms be embodied in apparatus varying from the construction here shown. I aim to cover, in my claims, all modifications which do not depart from the spirit and scope of my invention.

In case of the loss or cessation of the electric power the air brake part of my apparatus and its controller connection will be effective, as then on the release of the controller handle by the operator, the brakes are set automatically, independently of an electric current.

I do not confine myself to the valve shown as it is apparent that other valves or means of effecting the setting of brakes by opening and closing pipes than those shown, may be used; nor do I confine myself to the exact form of controller arm and lever illustrated in the drawing as it is apparent that other levers or mechanism may be used to produce the same results but.

What I claim as my invention and desire to secure by Letters Patent is:

1. An automatic safety stop device comprising a mechanism in the controller arm of an electric motor synchronously operated with an air-brake valve through a lever connection, substantially as described and shown.

2. In a united electric controller and air-brake having lever mechanism connecting the electric circuit switch with the air-brake valve, a pin-lock in the lever mechanism for locking the air-brake valve, substantially as described and shown.

3. In a united electric controller and fluid pressure brake, having lever mechanism within a controller handle connecting the electric circuit switch with the brake valve, means for locking the lever mechanism.

4. An automatic safety stop device comprising a mechanism in the controller arm of an electric motor, synchronously operated with an air-brake valve through a suitable connection, substantially as described and shown.

5. An automatic safety stop device comprising a mechanism in the controller arm of an electric motor synchronously operated with an air-brake valve and a circuit breaker, through a lever connection, substantially as described and shown.

6. In a safety stop device, a system of air-brakes working in conjunction with an electric controlling device, a controlling stand, a controlling arm and an air pipe, and mechanism so arranged that by the pressure of the hand on the controlling arm handle, the electric circuit and air passages are closed synchronously, substantially as described and shown.

7. An automatic safety stop device comprising a mechanism in a controller arm, the compressed air pipe of an air-brake, and a valve automatically operated by the automatic action of the mechanism in the controller arm to open the air-brake valve.

8. A safety stop device comprising a system of air-brakes working in conjunction with an electric controller device, a controlling stand, a controller arm, a mechanism in the controller arm, and an air pipe in which a mechanism is so arranged that by the removal of the hand from the mechanism in the controller arm, the electric circuit is broken and the air-brakes applied both synchronously and automatically.

9. In combination a motor circuit a jointly controlled power operated brake, and electric switch, normally, and in operation, holding the brake released and the current on, a controller having a handle to close and open the circuit and responsive to pressure to complete the circuit and hold the brake and switch in normal position, and means to synchronously and automatically break the circuit and set the brakes on removal of the pressure without removing the handle to off or to any position.

10. In an electrically propelled vehicle a jointly-controlled fluid pressure brake and electric switch normally and in operation holding the brake released and the current on, a controller having a handle to close and open the circuit and responsive to pressure to complete the circuit and hold the brake and switch in normal position, and means to synchronously, automatically and directly break the circuit and set the brakes on removal of the handle pressure without returning the handle to off position.

11. In an electrically propelled vehicle in combination, an electric circuit, a jointly controlled brake mechanism and electric switch both operated from a single handle, and means to complete the circuit and release the brakes on pressure upon the handle, and to simultaneously and automatically apply the brakes and break the circuit, on release of the handle pressure, without controller action.

12. In combination an electric circuit for the application of power, a controller for the circuit provided with a handle for closing and opening the circuit, a circuit breaker, an additional handle, and means to break the circuit and to restore the circuit by successive release and pressure of the additional handle, without movement of the controller handle.

13. In combination a motor control circuit, a controller in the circuit, a handle for the controller, a valve to operate an air brake, a circuit breaker in the motor control circuit, means to hold the valve and circuit breaker to joint action, and an additional spring-sustained handle, connected with the valve and switch, and holding the circuit normally broken and the valve normally open, but both responsive to pressure to close the circuit and close the valve.

14. A safety stop device for electric vehicles comprising the operative valve of a brake actuated by fluid pressure, an electric motor, an operating circuit therefor, a switch in said circuit, in operation normally closed by pressure, a controller and handle for closing and opening the circuit, and an additional handle connected with the switch and the operative valve, for actuating the switch and the operative valve, said additional handle acting automatically, synchronously and independently of controller action to break the circuit and apply the brakes on release of the said pressure.

15. In combination an electric circuit for the application of power, a controller for the circuit provided with a handle for closing and opening the circuit, a circuit breaker, a brake actuated by fluid pressure, an additional handle, and means to automatically and synchronously and jointly operate the brake and break the circuit independently of controller action from the additional handle.

16. In combination, an electric circuit for the application of power, a controller for the circuit provided with a handle for closing and opening the circuit, a circuit breaker, an air brake, an additional handle carried by the controller and means independently of controller action, to automatically set the brake, and open the circuit breaker, and to close the air brake valve and again complete the circuit from the additional handle.

17. In combination, an electric circuit, a motor in the circuit, a jointly controlled fluid pressure brake and electric switch, normally, when in operation, holding the brake released and the circuit closed, a controller having a handle to close and open the circuit controlling the motor and carrying a push-button responding to pressure to hold the brake and switch in normal position and control said brake and switch.

18. In a vehicle propelled by electric power and having a motor circuit, the valve of an air brake apparatus, a circuit breaker for the circuit, and connections, means controlled by a push-button for effecting successive joint automatic applications of the brakes and openings of the electric circuit, alternated with joint manual closing of the circuit and air brake valve.

19. The combination with an electric circuit used in giving power to electric vehicles, of a safety stop device comprising a brake actuated by fluid pressure, a push-button responsive to pressure and resilient thereunder, means to connect the push-button with the brake and a circuit breaking device, a circuit breaking device arranged to act in harmony with a brake to automatically break the circuit and automatically set the brake on release of the push-button.

20. In a vehicle propelled by electric power and having a motor circuit and a brake apparatus, means jointly controlled by a push-button for simultaneously and automatically robbing the circuit of power and automatically applying the brakes on release of the push-button.

21. In a vehicle propelled by electric power and having a motor circuit normally broken and the valve of an air brake normally open, means jointly controlled by a push-button for simultaneously closing the circuit and closing the air brake valve by pressure on the push-button.

22. In a vehicle propelled by electric power and having a motor circuit, a fluid pressure brake apparatus, a circuit breaker for the circuit, and connections, means controlled by a push-button for effecting successive joint applications of brake and circuit breaker by alternate pressure and release of the push-button.

23. In combination, an electric circuit for propelling vehicles, a controller in the circuit, a circuit breaker, and means, controlled from the controller, allowing successive repetitions of automatic breaking, and manual closing of the motor control circuit, with a still controller.

24. In a device for regulating the application of electric power, a controller, a controller handle therefor, a circuit breaker, and means controlled from said handle for automatically breaking the circuit and manually resetting the circuit breaker independently of controller action.

25. In a device for controlling the application of power, a controller, a controller handle therefor, a circuit breaker, the valve of an air brake, and means controlled from said handle to automatically open the circuit and air brake valve and to manually reset the circuit breaker and close the air brake valve all independently of controller action.

26. In a device for regulating the application of electric power an electric circuit, a controller therefor, a handle for the controller, a brake actuated by fluid pressure, and means, controlled from said handle to automatically set the brakes, independently of controller action on release of the handle.

27. In a device for regulating the application of electric power, an electric circuit, a controller therefor, a handle for the controller, a circuit breaker, a brake actuated by fluid pressure, and means controlled from said handle to automatically and to jointly set the brakes and break the circuit, independently of controller action, on release of the handle.

28. The combination with a controller for electric circuits of a circuit breaker normally in operation in series with the controller, means for opening the circuit at desired times by actuating the circuit breaker and means independent of controller action for resetting the circuit breaker.

29. In combination an electric circuit for the application of power, a controller for the circuit, a handle for the controller, a switch normally closed in operation, an air brake valve normally closed when the circuit is closed, an additional handle to operate the switch and the brake, and means to cause the switch and brake valve to assume their said normally closed positions, upon pressure on the additional handle.

30. In combination an electric circuit for the application of power, a controller, a handle for the controller, an air brake, a switch for the circuit, and an additional handle holding the circuit normally broken and the air brake pipe normally open, but responsive to pressure to close the circuit, and air brake pipe.

31. In an electric mechanism having a motor controller, an operating circuit, a handle to close the circuit, a power actuated brake, a switch in operation maintained normally in circuit, means responsive to pressure and carried by the controller arm but operating independently thereof for maintaining said switch in circuit and the brakes released and to automatically throw the switch and break the circuit and apply the brakes, in all positions of the controller arm on release of the pressure.

32. In combination a fluid pressure brake, a motor controller having an independent mechanism carried by the controller arm and connected with the brake and automatically operative to set the brake in all positions of the controller, on release of the controller handle.

33. In combination, an electric circuit, a motor controller in the circuit, and an independent mechanism carried by the controller and operative to automatically break the circuit in all positions of the controller handle on release of said handle.

34. In combination, an electric circuit, a motor controller controlling the application of power, a circuit breaker operating independently of the controller action to break the circuit and means to cause automatic action of the circuit breaker on release of the controller in all positions of the controller.

35. In an automatic safety stop device for electric vehicles, in combination an electric circuit, a motor controller controlling the application of power, a brake to check the momentum, an emergency device in the controller arm operatively connected to the brake and means to automatically set the brake on release of the controller arm.

36. An automatic safety stop device comprising a motor controller having an operative arm, an air brake valve, a circuit, a circuit breaker in the circuit and means operating through mechanism in the controller arm to automatically set the brake and synchronously operate the circuit breaker.

37. In combination, a motor controller, a handle for said controller, a brake operated by compressed air, a valve for controlling the application of the brake, means carried by the controller, but acting independently thereof, for automatically operating the valve to apply said brake when the controlling handle is released.

38. In combination, a motor controller, a handle for said controller, an air brake, a valve for controlling the application of the brake, means carried by the controller but acting independently of controller action, for automatically operating said valve on release of the handle and means for operating said operating means.

39. A safety stop device for electric vehicles comprising an electric circuit, a controller for the circuit liable to be locked by an arc or defect in controller mechanism, and emergency means, carried by the controller, but operative independently of the controller and with a still controller shaft, to automatically set the brakes and break the circuit.

40. A safety stop device for electric vehicles comprising an electric circuit, a controller normally controlling the circuit but liable to be locked through an arc, defect or accident, and emergency means to automatically set the brake on release of the controller operating means.

41. In combination, an electric circuit for propelling vehicles, a controller in the circuit, a brake operated by fluid pressure, and means independent of controller action, for automatically setting the brake on release of the controller.

42. In combination, an electric circuit for propelling vehicles, a controller in the circuit, a valve operating an air brake, and means independently of controller action to close said air brake valve by pressure on the controller handle.

43. In combination an electric circuit for propelling vehicles, a circuit breaker in the circuit, a controller, an air brake valve, and means whereby said circuit breaker and valve are held closed, independently of controller action, by the weight upon the controller of the operating hand.

44. In combination an electric circuit for propelling vehicles, a circuit breaker in the circuit, a controller, an air brake valve, and means whereby said circuit breaker and valve are held closed by the weight on the controller of the operative hand, and are automatically opened, independently of controller action, upon removal of said weight.

45. In combination an electric circuit for propelling vehicles a controller in the circuit, an air brake valve, and means whereby said brake valve is held inactive by the weight upon the controller of the operative hand, and is automatically opened, independently of controller action, by removal of said weight.

46. In combination an electric circuit for propelling vehicles, a controller in the circuit, a handle for the controller, a circuit breaker, an additional handle in the controller, and means whereby the grasp of the operative hand on the handles compresses the handles, and closes the circuit breaker 47. In a safety stop device for electric vehicles, an electric circuit, a circuit breaker, a controller in the circuit, a handle for the controller, an air brake valve, an additional handle carried by the controller and means whereby the grasp of the operative hand on the handles closes the air brake valve.

48. In a safety stop device for electric vehicles in combination, an electric circuit for propelling the vehicle, a controller having a handle, a circuit breaker, an additional handle carried by the controller, an air brake valve and means whereby the grasp of the operative hand on the handles closes the air brake valve and circuit breaker.

49. In combination, a controller, means for operating said controller, a power actuated brake, means for controlling the operation of said brake, and means, independent of controller action, to automatically operate said brake-controlling means to cause said brake to be applied, when the controller operating means is released.

In testimony whereof I affix my signature, in presence of two witnesses.

JOHN THOMAS McINTOSH.

Witnesses:
 ROBERT JOSEPH KERR,
 LAURA E. THOMPSON.